US012661985B2

(12) United States Patent
Miyamichi et al.

(10) Patent No.: US 12,661,985 B2
(45) Date of Patent: Jun. 23, 2026

(54) DISPLAY CONTROL METHOD AND VEHICLE

(71) Applicant: PANASONIC AUTOMOTIVE SYSTEMS CO., LTD., Kanagawa (JP)

(72) Inventors: Toshihiro Miyamichi, Kanagawa (JP); Yukimasa Komiya, Kanagawa (JP); Tsuyoshi Nishio, Chiba (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 236 days.

(21) Appl. No.: 18/589,105

(22) Filed: Feb. 27, 2024

(65) Prior Publication Data

US 2024/0294070 A1     Sep. 5, 2024

(30) Foreign Application Priority Data

Mar. 3, 2023     (JP) ................................. 2023-032954

(51) Int. Cl.
B60K 35/28         (2024.01)
B60K 35/235        (2024.01)
             (Continued)

(52) U.S. Cl.
CPC .......... B60K 35/285 (2024.01); B60K 35/235 (2024.01); B60K 35/81 (2024.01);
             (Continued)

(58) Field of Classification Search
CPC ........ B60K 2360/178; B60K 2360/785; B60K 35/00; B60K 35/10; B60K 35/235;
             (Continued)

(56) References Cited

U.S. PATENT DOCUMENTS

2020/0238826 A1* 7/2020 Mizobata ............... B60K 35/29
2022/0297713 A1* 9/2022 Wang .................. B60W 40/105

FOREIGN PATENT DOCUMENTS

EP          3040809        7/2016
JP       2005-324745      11/2005
                (Continued)

OTHER PUBLICATIONS

Office Action from Japan Patent Office (JPO) in Japanese Patent Appl. No. 2023-032954, dated Dec. 3, 2024, together with an English language translation.

(Continued)

*Primary Examiner* — Charles J Han
(74) *Attorney, Agent, or Firm* — Greenblum & Bernstein, P.L.C.

(57) ABSTRACT

A display control method for controlling displays of a first display device and a second display device included in a vehicle is provided. The display control method includes displaying, on the first display device, a transparent screen at a position where a driver is capable of viewing an outside of the vehicle through a windshield; locating a screen of the second display device at a position different from the screen of the first display device; and in a case that a line-of-sight position of the driver detected by a line-of-sight detection device included in the vehicle does not match the position of the screen of the second display device, controlling the display of the screen of the second display device more than the display of the screen of the first display device.

14 Claims, 7 Drawing Sheets

(51) Int. Cl.

| | |
|---|---|
| *B60K 35/81* | (2024.01) |
| *G06V 20/59* | (2022.01) |
| *G06V 40/16* | (2022.01) |
| *G06V 40/18* | (2022.01) |

(52) U.S. Cl.
CPC .......... *G06V 20/597* (2022.01); *G06V 40/161* (2022.01); *G06V 40/18* (2022.01); *B60K 2360/178* (2024.01); *B60K 2360/785* (2024.01)

(58) Field of Classification Search
CPC ...... B60K 35/28; B60K 35/285; B60K 35/29; B60K 35/81; G06V 20/597; G06V 40/161; G06V 40/18
See application file for complete search history.

(56) References Cited

FOREIGN PATENT DOCUMENTS

| | | |
|---|---|---|
| JP | 2007-249567 | 9/2007 |
| JP | 2009-248812 | 10/2009 |
| JP | 2013-256245 | 12/2013 |
| JP | 2015-077876 | 4/2015 |
| JP | 2017-149354 | 8/2017 |
| JP | 2020-117103 | 8/2020 |
| JP | 2022-142614 | 9/2022 |

OTHER PUBLICATIONS

Office Action from Japan Patent Office (JPO) in Japanese Patent Appl. No. 2023-032954, dated Sep. 3, 2024, together with an English language translation.

\* cited by examiner

| DISPLAY DEVICE | DISPLAY CONTENT |
|---|---|
| FIRST DISPLAY DEVICE | SPEED INFORMATION |
| | WARNING INFORMATION ON OBSTACLE DETECTION |
| | WARNING INFORMATION ON INTER-VEHICLE DISTANCE |
| | WARNING INFORMATION ON BLIND SPOT |
| | WARNING INFORMATION ON DOZING OR FATIGUE |
| | WARNING INFORMATION ON ANOTHER VEHICLE ON REAR SIDE |
| | WARNING INFORMATION ON PEDESTRIAN |
| SECOND DISPLAY DEVICE | NOTIFICATION INFORMATION ON EMERGENCY VEHICLE APPROACH |
| | NOTIFICATION INFORMATION ON TIRE AIR PRESSURE DECREASE |
| | NOTIFICATION INFORMATION ON DOOR OPENING |
| | NOTIFICATION INFORMATION ON NOT WEARING SEAT BELT |
| | NOTIFICATION INFORMATION ON FUEL SHORTAGE |
| THIRD DISPLAY DEVICE | NAVIGATION INFORMATION |
| | TRAFFIC JAM INFORMATION |
| | TOLL INFORMATION OF EXPRESSWAY |
| | AUDIO INFORMATION |
| | AIR CONDITIONER INFORMATION |
| | WEATHER INFORMATION |

*FIG. 4*

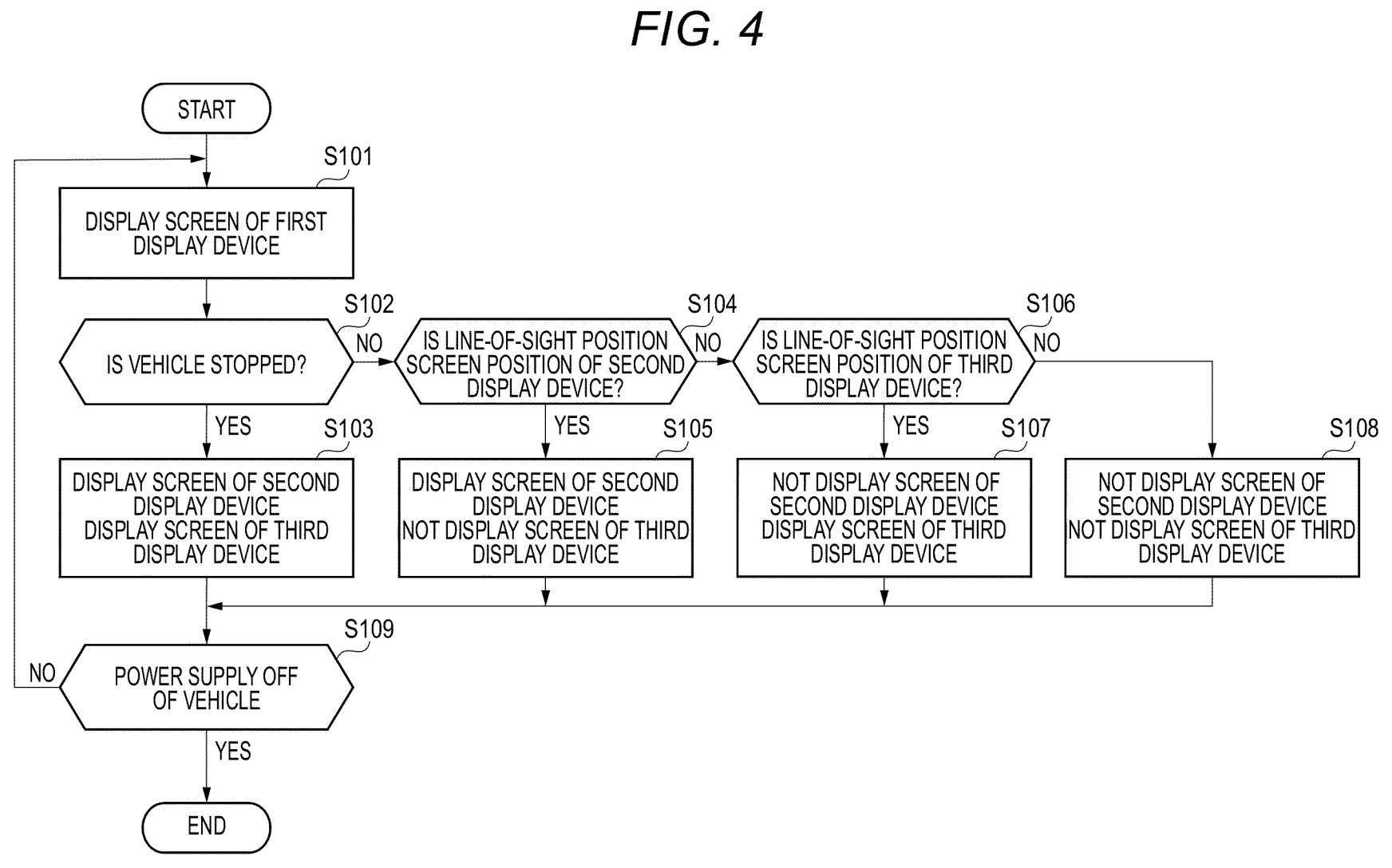

START

S101
DISPLAY SCREEN OF FIRST DISPLAY DEVICE

S102
IS VEHICLE STOPPED?

NO → S104
IS LINE-OF-SIGHT POSITION SCREEN POSITION OF SECOND DISPLAY DEVICE?

NO → S106
IS LINE-OF-SIGHT POSITION SCREEN POSITION OF THIRD DISPLAY DEVICE?

YES (S102) → S103
DISPLAY SCREEN OF SECOND DISPLAY DEVICE DISPLAY SCREEN OF THIRD DISPLAY DEVICE

YES (S104) → S105
DISPLAY SCREEN OF SECOND DISPLAY DEVICE NOT DISPLAY SCREEN OF THIRD DISPLAY DEVICE

YES (S106) → S107
NOT DISPLAY SCREEN OF SECOND DISPLAY DEVICE DISPLAY SCREEN OF THIRD DISPLAY DEVICE

NO (S106) → S108
NOT DISPLAY SCREEN OF SECOND DISPLAY DEVICE NOT DISPLAY SCREEN OF THIRD DISPLAY DEVICE

S109
POWER SUPPLY OFF OF VEHICLE

NO

YES → END

STATE TRANSITION OF FIRST DISPLAY DEVICE

STATE TRANSITION OF SECOND DISPLAY DEVICE

STATE TRANSITION OF THIRD DISPLAY DEVICE

DISPLAY CONTROL METHOD AND VEHICLE

CROSS-REFERENCE TO RELATED APPLICATIONS

This application is based on and claims priority under 35 USC 119 from Japanese Patent Application No. 2023-032954 filed on Mar. 3, 2023, the content of which is incorporated herein by reference.

TECHNICAL FIELD

The present disclosure relates to a display control method and a vehicle.

BACKGROUND ART

Patent Literature 1 discloses a vehicle display device including a head-up display that sets a display region above a driving visual field area in front of a driver on a windshield of a vehicle and displays road information in the display region, a camera that is installed in the vehicle and monitors a road in a predetermined direction from the vehicle, and a control unit that outputs an image detected by the camera as the road information to the head-up display and displays the road information in the display region of the windshield.

CITATION LIST

Patent Literature

Patent Literature 1: JP2005-324745A
Patent Literature 2: JP2009-248812A
Patent Literature 3: JP2013-256245A

SUMMARY OF INVENTION

In addition to the head-up display, various display devices such as an instrument cluster (IC) and/or a center information display (CID) are mounted on the vehicle. Although the driver is to concentrate on driving while the vehicle is traveling, may unintentionally move a line of sight on a screen of the display device. In order to enhance driving safety, it is required to reduce an unintentional line-of-sight movement of the driver.

An object of the present disclosure is to reduce unintentional line-of-sight movement by a driver.

A display control method according to one aspect of the present disclosure controls displays of a first display device and a second display device included in a vehicle. The display control method includes displaying, on the first display device, a transparent screen at a position where a driver is capable of viewing an outside of the vehicle through a windshield; locating a screen of the second display device at a position different from the screen of the first display device; and in a case that a line-of-sight position of the driver detected by a line-of-sight detection device included in the vehicle does not match the position of the screen of the second display device, controlling the display of the screen of the second display device more than the display of the screen of the first display device.

Further, a vehicle according to another aspect of the present disclosure includes a first wheel, a second wheel, a third wheel, and a fourth wheel, and is capable of traveling in a predetermined direction. The vehicle includes a first display device, a second display device, a line-of-sight detection device that detects a line of sight of a driver of the vehicle, and a display control device that controls both displays of the first display device and the second display device. The first display device displays a transparent screen at a position where the driver is capable of viewing an outside of the vehicle through a windshield, and a screen of the second display device is located at a position different from the screen of the first display device. In a case that a line-of-sight position of the driver detected by the line-of-sight detection device does not match the position of the screen of the second display device, the display control device controls the display of the screen of the second display device more than the display of the screen of the first display device.

These comprehensive or specific aspects may be implemented by a system, a device, a method, an integrated circuit, a computer program, or a recording medium, or any combination of the system, the device, the method, the integrated circuit, the computer program, and the recording medium.

According to the present disclosure, an unintentional line-of-sight movement of the driver can be reduced.

BRIEF DESCRIPTION OF DRAWINGS

FIG. 2 is a diagram illustrating a configuration example of an interior of the vehicle according to the first embodiment;

FIG. 3 is a diagram illustrating an example of information displayed on a screen by each display device according to the first embodiment;

FIG. 4 is a flowchart illustrating an example of processing of the display control device according to the first embodiment;

DESCRIPTION OF EMBODIMENTS

Hereinafter, an embodiment of the present disclosure will be described in detail with reference to the drawings as appropriate. However, more detailed description may be omitted. For example, detailed descriptions of already well-known matters and redundant descriptions of substantially the same configuration may be omitted. This is to avoid the following description from being unnecessarily redundant and to facilitate understanding by those skilled in the art. It should be noted that the accompanying drawings and the following description are provided for a person skilled in the art to sufficiently understand the present disclosure, and are not intended to limit the subject matter described in claims.

First Embodiment

<Configuration of Display Control System>

Figure 1:
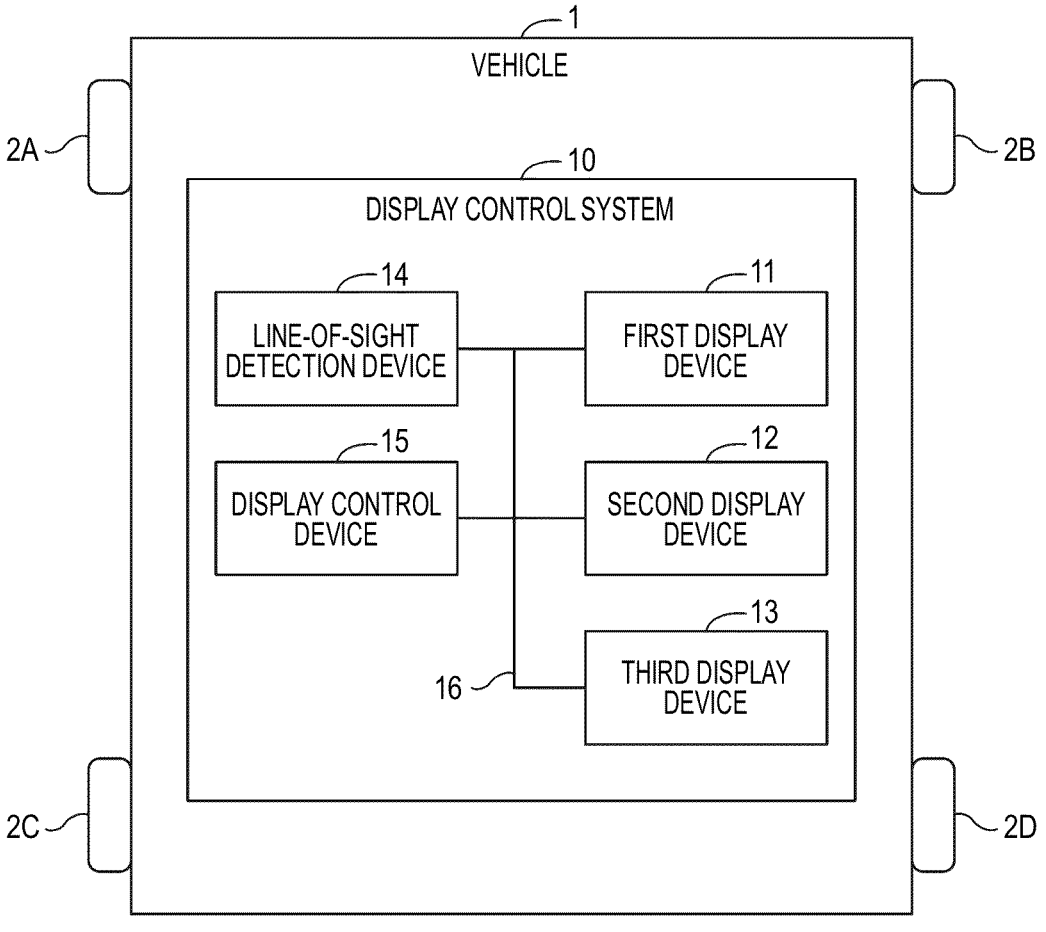
FIG. 1 is a block diagram illustrating a configuration example of a vehicle and a display control system according to a first embodiment.
Figure 2:
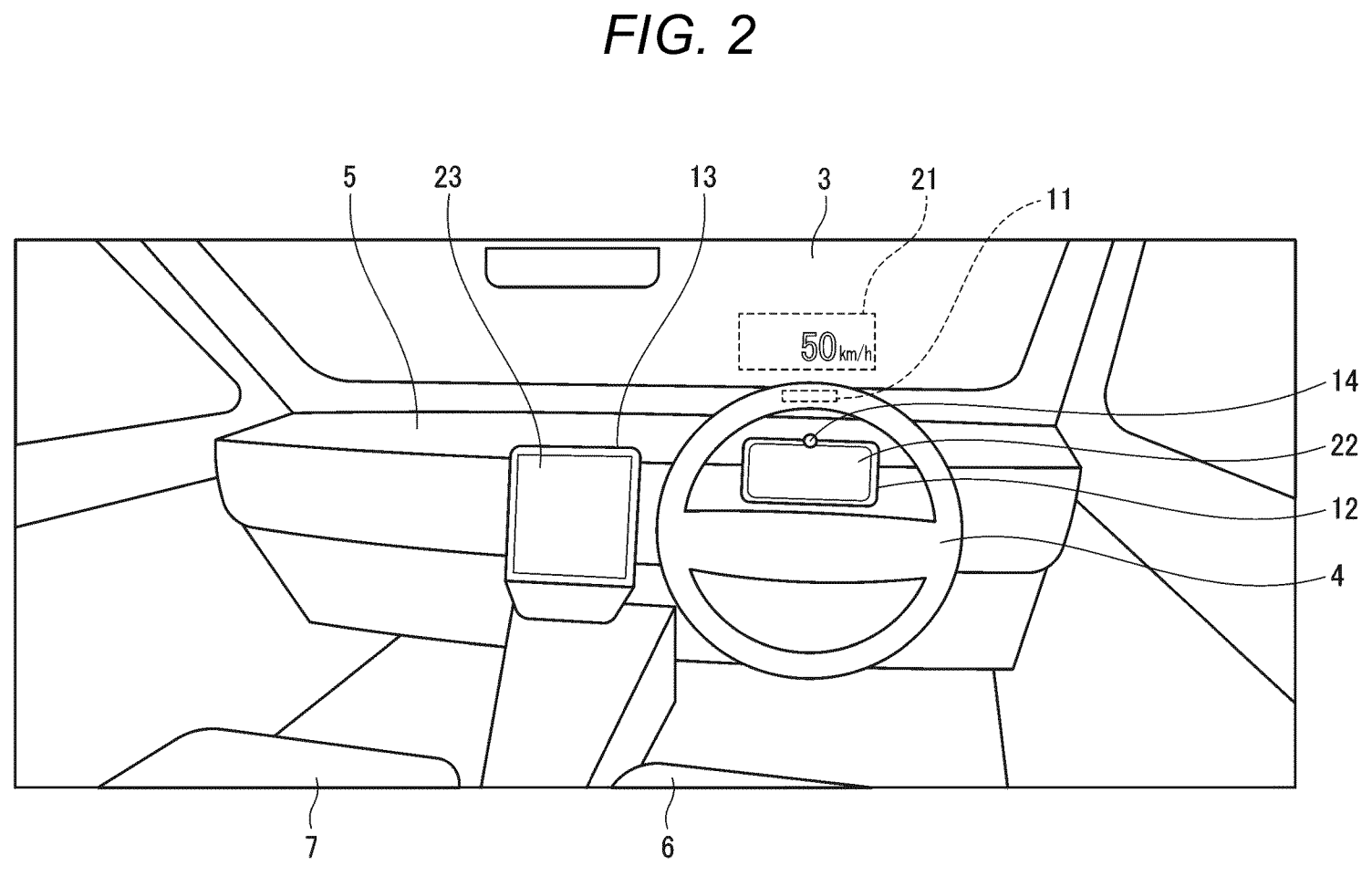

FIG. 1 is a block diagram illustrating a configuration example of a vehicle 1 and a display control system 10 according to a first embodiment. FIG. 2 is a diagram illustrating a configuration example of an interior of the vehicle 1 according to the first embodiment. FIG. 3 is a diagram illustrating an example of information displayed on a screen by each display device according to the first embodiment.

As illustrated in FIG. 1, the vehicle 1 includes at least a first wheel 2A, a second wheel 2B, a third wheel 2C, and a fourth wheel 2D, and can travel in a predetermined direction using the first wheel 2A, the second wheel 2B, the third wheel 2C, and the fourth wheel 2D.

As illustrated in FIG. 1, the vehicle 1 includes a display control system 10. The display control system 10 includes a first display device 11, a second display device 12, a third display device 13, a line-of-sight detection device 14, and a display control device 15. These devices are connected to an in-vehicle network 16 and can transmit and receive information to and from each other. Examples of the in-vehicle network 16 include a controller area network (CAN), LIN, FlexRay, and the like.

The first display device 11 displays a transparent screen at a position where the driver can visually recognize a scene outside the vehicle through the windshield 3. A user can visually recognize the outside of the vehicle through a screen 21 of the first display device.

The first display device 11 is, for example, a windshield projection type head-up display (HUD) and projects a screen onto the windshield 3. The driver can see a translucent screen projected on the windshield 3 and the scene outside the vehicle visible through the windshield 3 at a time.

The first display device 11 is, for example, a combiner projection type HUD and projects a screen onto a transparent combiner installed in front of the windshield 3. The driver can see a translucent screen projected on the combiner and the scene outside the vehicle visible through the combiner and the windshield 3 at a time.

In this way, the driver can view the screen displayed by the first display device 11 without moving the line of sight from the front.

As shown in FIG. 2, speed information of the vehicle 1 is displayed on the screen 21 of the first display device. Accordingly, the driver can check a speed of the vehicle 1 without moving the line of sight from the front. Accordingly, the driver can more safely drive the vehicle.

Further, first information, which is information for avoiding danger of driving, is displayed on the screen 21 of the first display device. As shown in FIG. 3, examples of the first information include the following.

warning information indicating that another vehicle or an obstacle is detected in front of the vehicle 1
  warning information indicating that an inter-vehicle distance is short
  warning information indicating that a two-wheeler or a pedestrian exists in a blind spot of the driver
  warning information indicating that dozing or fatigue of the driver is detected
  warning information indicating that another vehicle exists on a rear side of the vehicle 1
  warning information indicating that a pedestrian exists on a crosswalk The second display device 12 is, for example, an instrument cluster (IC), and is installed on, for example, a dashboard 5 behind a handle 4 disposed below the first display device 11. A screen 22 of the second display device is located at a position different from a screen 21 of the first display device, and is located, for example, below the screen 21 of the first display device.

Second information, which is information related to safe traveling of the vehicle 1, is displayed on the screen 22 of the second display device. As shown in FIG. 3, examples of the second information include the following.

notification information indicating that an emergency vehicle is approaching
  notification information indicating that an air pressure of a tire of the vehicle 1 is decreasing
  notification information indicating that a door of the vehicle 1 is opened
  notification information indicating that the driver or a passenger is not wearing a seat belt
  notification information indicating that fuel (or an amount of stored electricity) is insufficient The speed information of the vehicle 1 is displayed on the screen 21 of the first display device and may thus not be displayed on the screen 22 of the second display device. Accordingly, the driver does not move the line of sight to the screen 22 of the second display device in order to check the speed of the vehicle 1, and distracted driving of the driver can be prevented.

The third display device 13 is a center information display (CID), for example, and is installed on the dashboard 5 between a driver seat 6 and a front passenger seat 7, for example. A screen 23 of the third display device is located at a different position from the screen 21 of the first display device and the screen 22 of the second display device. For example, the screen 23 of the third display device is located at a position farther than the screen 22 of the second display device with respect to the driver seat 6.

Third information, which is information for assisting the traveling of the vehicle 1 is displayed on the screen 23 of the third display device. As shown in FIG. 3, examples of the third information include the following.

navigation Information
  traffic jam information
  toll information on expressway
  information related to audio
  information related to air conditioner
  weather Information The line-of-sight detection device 14 detects a line-of-sight position of the driver. For example, the line-of-sight detection device 14 includes a camera and detects the line-of-sight position of the driver by processing of the following steps S11 to S13.

(S11) The line-of-sight detection device 14 captures a face of the driver using a camera and generates a face image.
  (S12) The line-of-sight detection device 14 analyzes the face image (for example, analyzes a direction of the face and a direction of eyeballs) and detects the line-of-sight position of the driver.
  (S13) The line-of-sight detection device 14 provides line-of-sight position information including the detected line-of-sight position of the driver to another device. The line-of-sight position is expressed as, for example, two-dimensional coordinates on a virtual plane facing the driver.

Since the driver can see the screen 21 of the first display device without moving the line of sight from the front, the screen 21 of the first display device does not prevent the driver from concentrating on driving. On the other hand, since the driver can see the screen 22 of the second display device or the screen 23 of the third display device without moving the line of sight from the front, the screen 22 of the second display device or the screen 23 of the third display device can prevent the driver from concentrating on driving.

Therefore, the display control device 15 controls display of at least one screen among the first display device 11, the second display device 12, and the third display device 13 based on the line-of-sight position information received from the line-of-sight detection device 14. The display control device 15 may be implemented by an electronic control unit (ECU), a processor, a large scale integration (LSI), an application specific integrated circuit (ASIC), a field programmable gate array (FPGA), or the like.

For example, the display control device 15 controls the display of the screen 22 of the second display device more than the display of the screen 21 of the first display device when the line-of-sight position included in the line-of-sight position information does not match the position of the screen 22 of the second display device. Controlling the display of the screen 22 of the second display device more than the display of the screen 21 of the first display device may mean not displaying the screen 22 of the second display device and displaying the screen 21 of the first display device, or may mean not displaying information on the screen 22 of the second display device and displaying the information on the screen 21 of the first display device. Accordingly, when the driver looks forward and concentrates on driving, it is possible to reduce a situation in which the driver is distracted by the display of the screen 22 of the second display device and unintentionally moves the line of sight to the screen 22 of the second display device.

For example, the display control device 15 displays the screen 22 of the second display device when the line-of-sight position included in the line-of-sight position information matches the position of the screen 22 of the second display device. Accordingly, when the driver wants to view the second information output by the second display device 12, the driver can view the second information only by moving the line of sight to the screen 22 of the second display device.

For example, both the display of the screen 22 of the second display device and the display of the screen 23 of the third display device are controlled more than the display of the screen 21 of the first display device when the line-of-sight position included in the line-of-sight position information matches neither the position of the screen 22 of the second display device nor the position of the screen 23 of the third display device. Controlling both the display of the screen 22 of the second display device and the display of the screen 23 of the third display device more than the display of the screen 21 of the first display device may mean not displaying the screen 22 of the second display device and the screen 23 of the third display device and displaying the screen 21 of the first display device, or may mean not displaying the information on the screen 22 of the second display device and the screen 23 of the third display device and displaying the information on the screen 21 of the first display device. Accordingly, when the driver looks forward and concentrates on driving, it is possible to reduce a situation in which the driver is distracted by the display of the screen 22 of the second display device or the display of the screen 23 of the third display device and unintentionally moves the line of sight to the screen 22 of the second display device or the screen 23 of the third display device.

For example, the display control device 15 controls the display of the screen 22 of the second display device more than the display of the screen 23 of the third display device when the line-of-sight position included in the line-of-sight position information matches the position of the screen 23 of the third display device. Controlling the display of the screen 22 of the second display device more than the display of the screen 23 of the third display device may mean not displaying the screen 22 of the second display device and displaying the screen 23 of the third display device, or may mean not displaying the information on the screen 22 of the second display device and displaying the information on the screen 23 of the third display device. Accordingly, when the driver wants to view the third information output by the third display device 13, the driver can view the third information only by moving the line of sight to the screen 23 of the third display device. In addition, it is possible to reduce a situation in which the driver is distracted by the display of the screen 22 of the second display device and unintentionally moves the line of sight to the screen 22 of the second display device.

For example, the display control device 15 controls the display of the screen 23 of the third display device more than the display of the screen 22 of the second display device when the line-of-sight position included in the line-of-sight position information matches the position of the screen 22 of the second display device. Controlling the display of the screen 23 of the third display device more than the display of the screen 22 of the second display device may mean not displaying the screen 23 of the third display device and displaying the screen 22 of the second display device, or may mean not displaying the information on the screen 23 of the third display device and displaying the information on the screen 22 of the second display device. Accordingly, when the driver wants to view the second information output by the second display device 12, the driver can view the second information only by moving the line of sight to the screen 22 of the second display device. In addition, it is possible to reduce a situation in which the driver is distracted by the display of the screen 23 of the third display device and unintentionally moves the line of sight to the screen 23 of the third display device.

As described above, the display control system 10 according to the present embodiment can appropriately present information requested by the driver without preventing the driver from concentrating on driving (that is, while preventing the driver from distracted driving). Hereinafter, details will be described.

Processing of Display Control Device

FIG. 4 is a flowchart illustrating an example of processing of the display control device 15 according to the first embodiment. Next, the processing of the display control device 15 will be described in detail with reference to FIG. 4.

When detecting power supply ON (or engine ON) of the vehicle 1, the display control device 15 starts the processing illustrated in FIG. 4.

The display control device 15 causes the first display device 11 to display a screen (S101). That is, the display control device 15 displays the first information on the screen 21 of the first display device.

The display control device 15 determines whether the vehicle 1 is stopped based on, for example, the speed information (S102). The display control device 15 may determine whether the vehicle 1 is traveling, instead of determining whether the vehicle 1 is stopped.

When the vehicle 1 is stopped (or when the vehicle 1 is not traveling) (S102: YES), the display control device 15 displays the screen 22 of the second display device and the screen 23 of the third display device (S103). That is, the display control device 15 displays the second information on the screen 22 of the second display device and displays the third information on the screen 23 of the third display device. Accordingly, the driver can immediately view the screen 22 of the second display device or the screen 23 of the third display device while the vehicle 1 is stopped. Then, the display control device 15 causes the processing to proceed to step S109.

When the vehicle 1 is not stopped (or when the vehicle 1 is traveling) (S102: NO), the display control device 15 determines whether the line-of-sight position of the driver matches the position of the screen 22 of the second display device (S104).

When the line-of-sight position of the driver matches the position of the screen 22 of the second display device (S104: YES), the display control device 15 displays the screen 22 of the second display device and does not display the screen 23 of the third display device (S105). Note that not displaying the screen 23 of the third display device may mean not displaying the third information on the screen 23 of the third display device or setting the screen 23 of the third display device darker than usual. Accordingly, the driver can obtain the second information by moving the line of sight on the screen 22 of the second display device. In addition, it is possible to reduce distraction of the driver on the screen 23 of the third display device. Then, the display control device 15 causes the processing to proceed to step S109.

When the line-of-sight position of the driver does not match the position of the screen 22 of the second display device (S104: NO), the display control device 15 determines whether the line-of-sight position of the driver matches the position of the screen 23 of the third display device (S106).

When the line-of-sight position of the driver matches the position of the screen 23 of the third display device (S106: YES), the display control device 15 displays the screen 23 of the third display device and does not display the screen 22 of the second display device (S107). Note that not displaying the screen 22 of the second display device may mean not displaying the second information on the screen 22 of the second display device or setting the screen 22 of the second display device darker than usual. Accordingly, the driver can obtain the third information by moving the line of sight on the screen 23 of the third display device. In addition, it is possible to reduce distraction of the driver on the screen 22 of the second display device. Then, the display control device 15 causes the processing to proceed to step S109.

When the line-of-sight position of the driver matches neither the position of the screen 22 of the second display device nor the position of the screen 23 of the third display device (S106: NO), the display control device 15 does not display the screen 22 of the second display device and the screen 23 of the third display device (S108). Note that not displaying the screen 22 of the second display device and the screen 23 of the third display device may mean not displaying the second information and the third information on the screen 22 of the second display device and the screen 23 of the third display device, respectively, or may mean setting the screen 22 of the second display device and the screen 23 of the third display device darker than usual. Accordingly, when the driver looks forward and concentrates on driving, it is possible to reduce a situation in which the driver is distracted by the display of the screen 22 of the second display device or the display of the screen 23 of the third display device and unintentionally moves the line of sight to the screen 22 of the second display device or the screen 23 of the third display device. Then, the display control device 15 causes the processing to proceed to step S109.

The display control device 15 determines whether power supply OFF (or engine OFF) of the vehicle 1 is detected (S109). When the power supply OFF (or the engine OFF) is not detected (S109: NO), the display control device 15 returns the processing to step S101. When the power supply OFF (or the engine OFF) is detected (S109: YES), the present processing is ended.

<State Transition of First Display Device>

Figure 5:
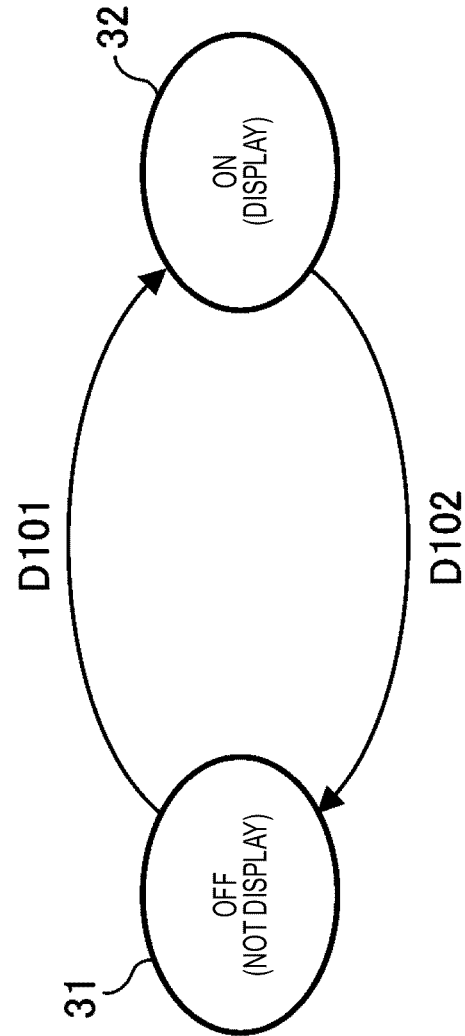
FIG. 5 is a diagram illustrating a state transition of a first display device according to the first embodiment.

FIG. 5 is a diagram illustrating a state transition of the first display device 11 according to the first embodiment. As shown in FIG. 5, the display control device 15 may cause the state of the first display device 11 to transition.

When detecting the power supply ON (or engine ON) of the vehicle 1 while the first display device 11 is in an OFF state 31, the display control device 15 causes the first display device 11 to transition to an ON state 32 (D101). When the first display device 11 is in the ON state 32, the display control device 15 displays the screen 21 of the first display device. For example, the display control device 15 transmits the first information to the first display device 11 or brightens the screen 21 of the first display device.

When detecting the power supply OFF (or engine OFF) of the vehicle 1 while the first display device 11 is in the ON state 32, the display control device 15 causes the first display device 11 to transition to the OFF state 31 (D102). When the first display device 11 is in the OFF state 31, the display control device 15 does not display the screen 21 of the first display device. For example, the display control device 15 does not transmit the first information to the first display device 11 or sets the screen 21 of the first display device dark.

<State Transition of Second Display Device>

Figure 6:
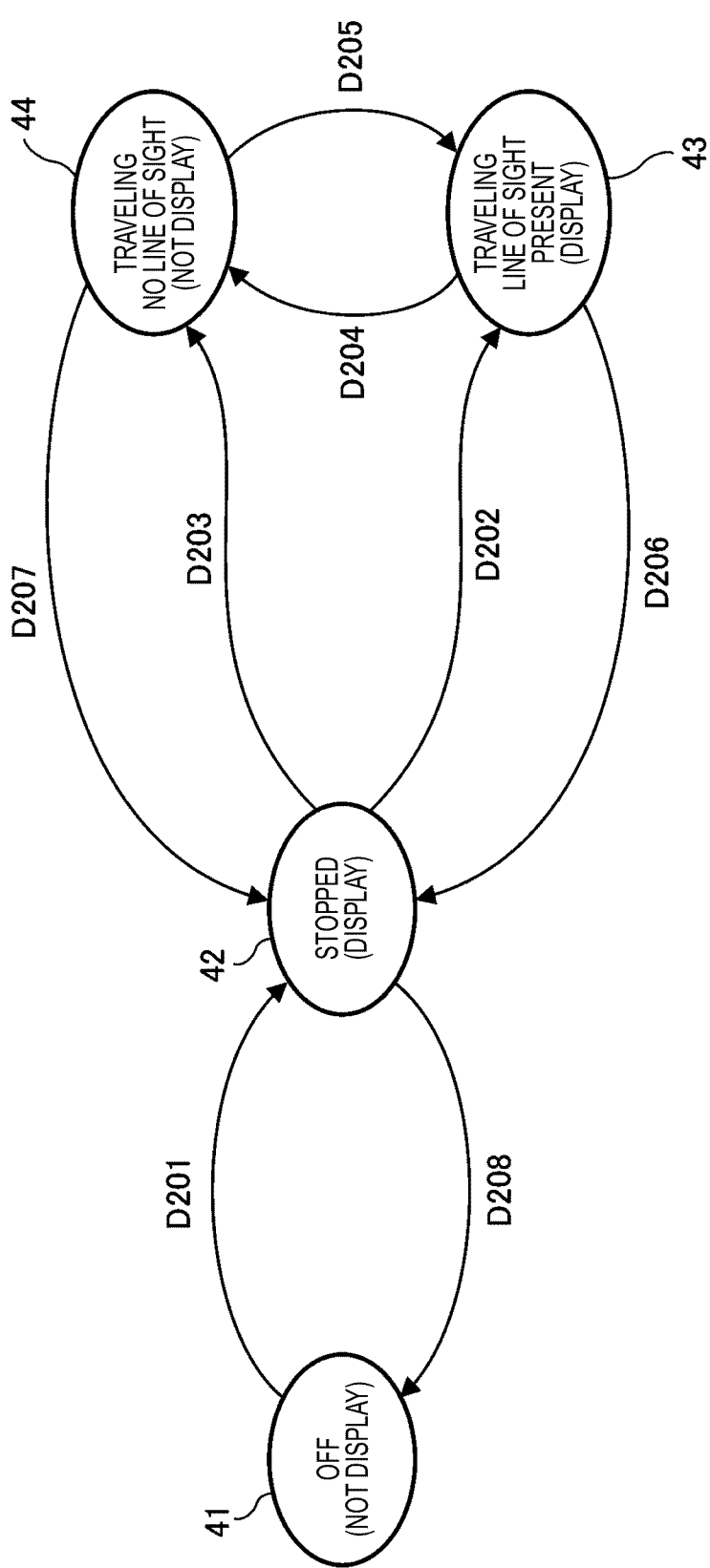
FIG. 6 is a diagram illustrating a state transition of a second display device according to the first embodiment.

FIG. 6 is a diagram illustrating a state transition of the second display device 12 according to the first embodiment. As shown in FIG. 6, the display control device 15 may cause a state of the second display device 12 to transition.

When detecting the power supply ON (or engine ON) of the vehicle 1 while the second display device 12 is in an OFF state 41, the display control device 15 causes the second display device 12 to transition to a stopped state 42 (D201). When the second display device 12 is in the stopped state 42, the display control device 15 displays the screen 22 of the second display device. For example, the display control device 15 transmits the second information to the second display device 12 or brightens the screen 22 of the second display device.

When detecting a start of traveling of the vehicle 1 and detecting that the line-of-sight position of the driver matches the position of the screen 22 of the second display device while the second display device 12 is in the stopped state 42, the display control device 15 causes the second display device 12 to transition to a traveling line-of-sight present state 43 (D202). When the second display device 12 is in the traveling line-of-sight present state 43, the display control device 15 displays the screen 22 of the second display device. For example, the display control device 15 transmits the second information to the second display device 12 or brightens the screen 22 of the second display device.

When detecting the start of traveling of the vehicle 1 and detecting that the line-of-sight position of the driver does not match the position of the screen 22 of the second display device while the second display device 12 is in the stopped state 42, the display control device 15 causes the second display device 12 to transition to a traveling no-line-of-sight present state 44 (D203). When the second display device 12 is in the traveling no-line-of-sight present state 44, the display control device 15 does not display the screen 22 of the second display device. For example, the display control device 15 does not transmit the second information to the second display device 12 or sets the screen 22 of the second display device dark.

When detecting that the line-of-sight position of the driver does not match the position of the screen 22 of the second display device (that is, the driver averts the line of sight) while the second display device 12 is in the traveling line-of-sight present state 43, the display control device 15 causes the second display device 12 to transition to the traveling no-line-of-sight present state 44 (D204).

When detecting that the line-of-sight position of the driver matches the position of the screen 22 of the second display device (that is, the driver directs the line of sight) while the second display device 12 is in the traveling no-line-of-sight present state 44, the display control device 15 causes the second display device 12 to transition to the traveling line-of-sight present state 43 (D205).

When detecting the stop of the vehicle 1 while the second display device 12 is in the traveling line-of-sight present state 43, the display control device 15 causes the second display device 12 to transition to the stopped state 42 (D206).

When detecting the stop of the vehicle 1 while the second display device 12 is in the traveling no-line-of-sight present state 44, the display control device 15 causes the second display device 12 to transition to the stopped state 42 (D207).

When detecting the power supply OFF (or engine OFF) of the vehicle 1 while the second display device 12 is in the stopped state 42, the display control device 15 causes the second display device 12 to transition to the OFF state 41 (D208). When the second display device 12 is in the OFF state 41, the display control device 15 does not display the screen 22 of the second display device. For example, the display control device 15 does not transmit the second information to the second display device 12 or sets the screen 22 of the second display device dark.

<State Transition of Third Display Device>

Figure 7:
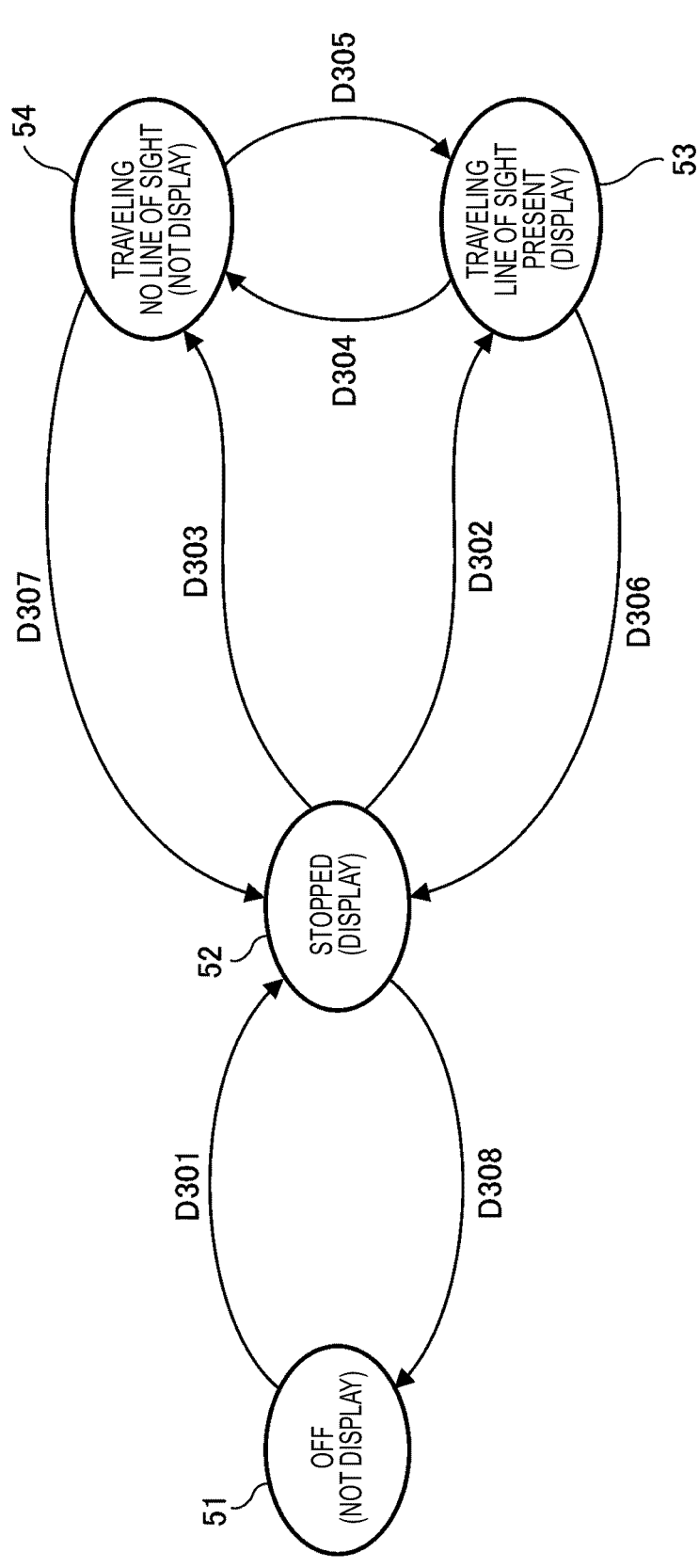
FIG. 7 is a diagram illustrating a state transition of a third display device according to the first embodiment.

FIG. 7 is a diagram illustrating a state transition of the third display device 13 according to the first embodiment. As shown in FIG. 7, the display control device 15 may cause a state of the third display device 13 to transition.

When detecting the power supply ON (or engine ON) of the vehicle 1 while the third display device 13 is in an OFF state 51, the display control device 15 causes the third display device 13 to transition to a stopped state 52 (D301). When the third display device 13 is in the stopped state 52, the display control device 15 displays the screen 23 of the third display device. For example, the display control device 15 transmits the third information to the third display device 13 or brightens the screen 23 of the third display device.

When detecting the start of traveling of the vehicle 1 and detecting that the line-of-sight position of the driver matches the position of the screen 23 of the third display device while the third display device 13 is in the stopped state 52, the display control device 15 causes the third display device 13 to transition to a traveling line-of-sight present state 53 (D302). When the third display device 13 is in the traveling line-of-sight present state 53, the display control device 15 displays the screen 23 of the third display device. For example, the display control device 15 transmits the third information to the third display device 13 or brightens the screen 23 of the third display device.

When detecting the start of traveling of the vehicle 1 and detecting that the line-of-sight position of the driver does not match the position of the screen 23 of the third display device while the third display device 13 is in the stopped state 52, the display control device 15 causes the third display device 13 to transition to a traveling no-line-of-sight present state 54 (D303). When the third display device 13 is in the traveling no-line-of-sight present state 54, the display control device 15 does not display the screen 23 of the third display device. For example, the display control device 15 does not transmit the third information to the third display device 13 or sets the screen 23 of the third display device dark.

When detecting that the line-of-sight position of the driver does not match the position of the screen 23 of the third display device (that is, the driver averts the line of sight) while the third display device 13 is in the traveling line-of-sight present state 53, the display control device 15 causes the third display device 13 to transition to the traveling no-line-of-sight present state 54 (D304).

When detecting that the line-of-sight position of the driver matches the position of the screen 23 of the third display device (that is, the driver directs the line of sight) while the third display device 13 is in the traveling no-line-of-sight present state 54, the display control device 15 causes the third display device 13 to transition to the traveling line-of-sight present state 53 (D305).

When detecting the stop of the vehicle 1 while the third display device 13 is in the traveling line-of-sight present state 53, the display control device 15 causes the third display device 13 to transition to the stopped state 52 (D306).

When detecting the stop of the vehicle 1 while the third display device 13 is in the traveling no-line-of-sight present state 54, the display control device 15 causes the third display device 13 to transition to the stopped state 52 (D307).

When detecting the power supply OFF (or engine OFF) of the vehicle 1 while the third display device 13 is in the stopped state 52, the display control device 15 causes the third display device 13 to transition to the OFF state 51 (D308). When the third display device 13 is in the OFF state 51, the display control device 15 does not display the screen 23 of the third display device. For example, the display control device 15 does not transmit the third information to the third display device 13 or sets the screen 23 of the third display device dark.

Summary of Present Invention

The following technique is disclosed from the above description of the embodiment.

Technique 1

In a display control method for controlling displays of the first display device 11 and the second display device 12 included in the vehicle 1, the first display device 11 displays a transparent screen (for example, the screen 21 of the first display device) at a position where a driver is capable of viewing an outside of the vehicle through the windshield 3, the screen 22 of the second display device is located at a position different from the screen 21 of the first display device, and the display of the screen 22 of the second display device is controlled more than the display of the screen 21 of the first display device when a line-of-sight position of the driver detected by the line-of-sight detection device 14 included in the vehicle 1 does not match the position of the screen 22 of the second display device.

Accordingly, when the line-of-sight position of the driver does not match the position of the screen 22 of the second display device, the display of the screen 22 of the second display device is controlled more than the display of the screen 21 of the first display device, and thus it is possible to reduce unintentional movement of the line of sight of the driver to the screen 22 of the second display device.

Technique 2

In the display control method according to the technique 1, the screen 22 of the second display device is located below the screen 21 of the first display device.

Accordingly, it is possible to reduce the unintentional movement of the line of sight of the driver to the screen 22 of the second display device located below the screen 21 of the first display device.

Technique 3

In the display control method according to the technique 1 or 2, controlling the display of the screen 22 of the second display device more than the display of the screen 21 of the first display device means not displaying the screen 22 of the second display device and displaying the screen 21 of the first display device.

Accordingly, when the line-of-sight position of the driver does not match the position of the screen 22 of the second display device, the screen 22 of the second display device is not displayed, and thus it is possible to reduce the unintentional movement of the line of sight of the driver to the screen 22 of the second display device. That is, the distracted driving of the driver can be reduced.

Technique 4

In the display control method according to the technique 1 or 2, controlling the display of the screen 22 of the second display device more than the display of the screen 21 of the first display device means not displaying information on the screen 22 of the second display device and displaying the information on the screen 21 of the first display device.

Accordingly, when the line-of-sight position of the driver does not match the position of the screen 22 of the second display device, no information is displayed on the screen 22 of the second display device, and thus it is possible to reduce the unintentional movement of the line of sight of the driver to the screen 22 of the second display device. That is, the distracted driving of the driver can be reduced.

Technique 5

In the display control method according to any one of the techniques 1 to 4, the screen 22 of the second display device is displayed when the line-of-sight position of the driver detected by the line-of-sight detection device 14 matches the position of the screen 22 of the second display device.

Accordingly, the driver can obtain the information provided by the second display device by moving the line of sight to the screen 22 of the second display device.

Technique 6

In the display control method according to any one of the techniques 1 to 5, the screen 22 of the second display device is displayed regardless of whether the line-of-sight position of the driver detected by the line-of-sight detection device 14 matches the position of the screen 22 of the second display device, when the vehicle 1 is stopped.

Accordingly, the driver can obtain the information provided by the second display device 12 while the vehicle 1 is stopped.

Technique 7

In the display control method according to any one of the techniques 1 to 6, speed information of the vehicle 1 is displayed on the screen 21 of the first display device, and the speed information is not displayed on the screen 22 of the second display device.

Accordingly, when checking the speed of the vehicle 1, the driver views the screen 21 of the first display device instead of the screen 22 of the second display device, and can thus concentrate on driving without deviating the line of sight from the front (that is, without distracted driving).

Technique 8

In the display control method according to any one of the techniques 1 to 7, the vehicle 1 further includes the third display device 13, the screen 23 of the third display device is located at a position farther than the screen 22 of the second display device with respect to a seat (for example, the driver seat 6) of the driver, and both the display of the screen 22 of the second display device and a display of the screen 23 of the third display device are controlled more than the display of the screen 21 of the first display device when the line-of-sight position of the driver detected by the line-of-sight detection device 14 matches neither the position of the screen 22 of the second display device nor the position of the screen 23 of the third display device.

Accordingly, since both the display of the screen 22 of the second display device and the display of the screen 23 of the third display device are controlled more than the display of the screen 21 of the first display device when the line-of-sight position of the driver matches neither the position of the screen 22 of the second display device nor the position of the screen 23 of the third display device, it is possible to reduce the unintentional movement of the line of sight of the driver to the screen 22 of the second display device or the screen 23 of the third display device. That is, the distracted driving of the driver can be reduced.

Technique 9

In the display control method according to the technique 8, the display of the screen 22 of the second display device is controlled more than the display of the screen 23 of the third display device when the line-of-sight position of the driver detected by the line-of-sight detection device 14 matches the position of the screen 23 of the third display device, and the display of the screen 23 of the third display device is controlled more than the display of the screen 22 of the second display device when the line-of-sight position of the driver detected by the line-of-sight detection device 14 matches the position of the screen 22 of the second display device.

Accordingly, the driver can obtain the information provided by the third display device 13 by moving the line of sight to the screen 23 of the third display device, and can obtain the information provided by the second display device 12 by moving the line of sight to the screen 22 of the second display device.

Technique 10

In the display control method according to the technique 8 or 9, information for avoiding danger of driving is displayed on the screen 21 of the first display device, information related to safe traveling of the vehicle is displayed on the screen 22 of the second display device, and information for assisting traveling of the vehicle 1 is displayed on the screen 23 of the third display device.

Accordingly, the driver can obtain the information for avoiding the danger of driving from the screen 21 of the first display device, the information related to the safe traveling of the vehicle from the screen 22 of the second display device, and the information for assisting the traveling of the vehicle 1 from the screen 23 of the third display device.

Technique 11

The vehicle 1 including the first wheel 2A, the second wheel 2B, the third wheel 2C, and the fourth wheel 2D and being capable of traveling in a predetermined direction includes: the first display device 11; the second display device; 12; the line-of-sight detection device 14 that detects a line of sight of a driver of the vehicle 1; and the display control device 15 that controls displays of the first display device 11 and the second display device 12. The first display device 11 displays a transparent screen (for example, the screen 21 of the first display device) at a position where the driver is capable of viewing an outside of the vehicle through the windshield 3. The screen 22 of the second display device is located at a position different from the screen 21 of the first display device. The display control device 15 controls the display of the screen 22 of the second display device more than the display of the screen 21 of the first display device when a line-of-sight position of the driver detected by the line-of-sight detection device 14 does not match the position of the screen 22 of the second display device.

Accordingly, when the line-of-sight position of the driver does not match the position of the screen 22 of the second display device, the display of the screen 22 of the second display device is controlled more than the display of the screen 21 of the first display device, and thus it is possible to reduce unintentional movement of the line of sight of the driver to the screen 22 of the second display device.

Technique 12

In the vehicle 1 according to the technique 11, the screen 22 of the second display device is located below the screen 21 of the first display device.

Accordingly, it is possible to reduce the unintentional movement of the line of sight of the driver to the screen 22 of the second display device located below the screen 21 of the first display device.

Technique 13

In the vehicle 1 according to the technique 11 or 12, controlling the display of the screen 22 of the second display device more than the display of the screen 21 of the first display device means not displaying the screen 22 of the second display device and displaying the screen 21 of the first display device.

Accordingly, when the line-of-sight position of the driver does not match the position of the screen 22 of the second display device, the screen 22 of the second display device is not displayed, and thus it is possible to reduce the unintentional movement of the line of sight of the driver to the screen 22 of the second display device. That is, the distracted driving of the driver can be reduced.

Technique 14

In the vehicle 1 according to the technique 11 or 12, controlling the display of the screen 22 of the second display device more than the display of the screen 21 of the first display device means not displaying information on the screen 22 of the second display device and displaying the information on the screen 21 of the first display device.

Accordingly, when the line-of-sight position of the driver does not match the position of the screen 22 of the second display device, no information is displayed on the screen 22 of the second display device, and thus it is possible to reduce the unintentional movement of the line of sight of the driver to the screen 22 of the second display device. That is, the distracted driving of the driver can be reduced.

Technique 15

In the vehicle 1 according to any one of the techniques 11 to 14, the display control device 15 displays the screen 22 of the second display device when the line-of-sight position of the driver detected by the line-of-sight detection device 14 matches the position of the screen 22 of the second display device.

Accordingly, the driver can obtain the information provided by the second display device by moving the line of sight to the screen 22 of the second display device.

Technique 16

In the vehicle 1 according to any one of the techniques 11 to 15, the display control device 15 displays the screen 22 of the second display device regardless of whether the line-of-sight position of the driver detected by the line-of-sight detection device 14 matches the position of the screen 22 of the second display device, when the vehicle 1 is stopped.

Accordingly, the driver can obtain the information provided by the second display device 12 while the vehicle 1 is stopped.

Technique 17

In the vehicle 1 described in the techniques 11 to 16, the display control device 15 displays speed information of the vehicle 1 on the screen 21 of the first display device, and does not display the speed information on the screen 22 of the second display device.

Accordingly, when checking the speed of the vehicle 1, the driver views the screen 21 of the first display device instead of the screen 22 of the second display device, and can thus concentrate on driving without deviating the line of sight from the front (that is, without distracted driving).

Technique 18

In the vehicle 1 according to any one of the techniques 11 to 17, the vehicle 1 further includes the third display device 13, the screen 23 of the third display device is located at a position farther than the screen 22 of the second display device with respect to a seat (for example, the driver seat 6) of the driver, and the display control device 15 controls both the display of the screen 22 of the second display device and a display of the screen 23 of the third display device more than the display of the screen 21 of the first display device when the line-of-sight position of the driver detected by the line-of-sight detection device 14 matches neither the position of the screen 22 of the second display device nor the position of the screen 23 of the third display device.

Accordingly, since both the display of the screen 22 of the second display device and the display of the screen 23 of the third display device are controlled more than the display of the screen 21 of the first display device when the line-of-sight position of the driver matches neither the position of the screen 22 of the second display device nor the position of the screen 23 of the third display device, it is possible to reduce the unintentional movement of the line of sight of the driver to the screen 22 of the second display device or the screen 23 of the third display device. That is, the distracted driving of the driver can be reduced.

Technique 19

In the vehicle 1 according to the technique 18, the display control device 15 controls the display of the screen 22 of the second display device more than the display of the screen 23 of the third display device when the line-of-sight position of the driver detected by the line-of-sight detection device 14 matches the position of the screen 23 of the third display device, and controls the display of the screen 23 of the third display device more than the display of the screen 22 of the second display device when the line-of-sight position of the driver detected by the line-of-sight detection device 14 matches the position of the screen 22 of the second display device.

Accordingly, the driver can obtain the information provided by the third display device 13 by moving the line of sight to the screen 23 of the third display device, and can obtain the information provided by the second display device 12 by moving the line of sight to the screen 22 of the second display device.

Technique 20

In the vehicle 1 according to the technique 18 or 19, the display control device 15 displays information for avoiding danger of driving on the screen 21 of the first display device, displays information related to safe traveling of the vehicle on the screen 22 of the second display device, and displays information for assisting traveling of the vehicle on the screen 23 of the third display device.

Accordingly, the driver can obtain the information for avoiding the danger of driving from the screen 21 of the first display device, the information related to the safe traveling of the vehicle from the screen 22 of the second display device, and the information for assisting the traveling of the vehicle 1 from the screen 23 of the third display device.

Although the embodiment has been described above with reference to the accompanying drawings, the present disclosure is not limited to such an embodiment. It is apparent to those skilled in the art that various changes, modifications, substitutions, addition, deletions, and equivalents can be conceived within the scope described in the claims, and it is understood that the scope of the present disclosure includes these. In addition, constituent elements in the embodiment described above may be freely combined without departing from the gist of the invention.

INDUSTRIAL APPLICABILITY

The technique of the present disclosure is useful for a vehicle including a plurality of display devices in the vehicle.

What is claimed is:

1. A display control method for controlling display devices in a vehicle, the display control method comprising:
    displaying first information on a first screen of a first display device of the display devices while the vehicle is traveling, the first screen being transparent and located at a first position in the vehicle, a driver of the vehicle being capable of viewing an outside of the vehicle through the first screen and a windshield;
    displaying second information on a second screen of a second display device of the display devices when a line-of-sight position of the driver detected by a line-of-sight detection device is on the second screen of the second display device while the vehicle is travelling, the second screen being located at a second position in the vehicle, the second position being different from the first position of the first screen of the first display device;
    controlling the second display device to not display the second information when the line-of-sight position of the driver detected by the line-of-sight detection device is not on the second screen of the second display device while the vehicle is travelling; and
    displaying the second information on the second screen of the second display device regardless of whether the line-of-sight position of the driver detected by the line-of-sight detection device is on the second screen while the vehicle is stopped.

2. The display control method according to claim 1, wherein
    the second position of the second screen of the second display device is located below the first position of the first screen of the first display device in the vehicle.

3. The display control method according to claim 1, wherein
    the controlling of the second display device to not display the second information includes not displaying the second screen of the second display device.

4. The display control method according to claim 1, wherein
    the controlling of the second display device to not display the second information includes not displaying the second information on the second screen of the second display device.

5. The display control method according to claim 1, wherein
    speed information of the vehicle is configured to be displayed on the first screen of the first display device as the first information, and
    the speed information is not configured to be displayed on the second screen of the second display device as the second information.

6. The display control method according to claim 1, further comprising:
    displaying third information on a third screen of a third display device of the display devices when the line-of-sight position of the driver detected by the line-of-sight detection device is on the third screen of the third display device while the vehicle is travelling, the third screen being located at a third position farther than the second position of the second screen with respect to a seat of the driver in the vehicle, the third position being different from the first position of the first screen of the first display device; and
    controlling the third display device to not display the third information when the line-of-sight position of the driver detected by the line-of-sight detection device is not on the third screen of the third display device while the vehicle is travelling.

7. The display control method according to claim 6, wherein avoiding danger information for avoiding danger of driving is configured to be displayed on the first screen of the first display device as the first information, safety traveling information related to safe traveling of the vehicle is configured to be displayed on the second screen of the second display device as the second information, and assisting traveling information for assisting traveling of the vehicle is configured to be displayed on the third screen of the third display device as the third information.

8. A vehicle configured to travel in a direction, the vehicle comprising:

a body;

a first wheel coupled with the body and aligned in the direction;

a second wheel coupled with the body and aligned in the direction;

a third wheel coupled with the body and aligned in the direction;

a fourth wheel coupled with the body and aligned in the direction;

a first display device including a first screen, the first screen being transparent and located at a first position in the vehicle, a driver of the vehicle being capable of viewing an outside of the vehicle through the first screen and a windshield;

a second display device including a second screen, the second screen being located at a second position in the vehicle, the second position being different from the first position of the first screen of the first display device; and a line-of-sight detection device configured to detect a line-of-sight position of the driver of the vehicle, wherein the vehicle displays first information on the first screen of the first display device while the vehicle is traveling, the vehicle displays second information on the second screen of the second display device when the line-of-sight position of the driver detected by the line-of-sight detection device is on the second screen of the second display device while the vehicle is travelling, the vehicle controls the second display device to not display the second information when the line-of-sight position of the driver detected by the line-of-sight detection device is not on the second screen of the second display device while the vehicle is travelling, and the vehicle displays the second information on the second screen of the second display device regardless of whether the line-of-sight position of the driver detected by the line-of-sight detection device is on the second screen while the vehicle is stopped.

9. The vehicle according to claim 8, wherein the second position of the second screen of the second display device is located below the first position of the first screen of the first display device in the vehicle.

10. The vehicle according to claim 8, wherein the vehicle controls the second display device to not display the second screen of the second display device when the line-of-sight position of the driver is not on the second screen while the vehicle is travelling.

11. The vehicle according to claim 8, wherein the vehicle controls the second display device to not display the second information on the second screen when the line-of-sight position of the driver is not on the second screen while the vehicle is travelling.

12. The vehicle according to claim 8, wherein the vehicle displays speed information of the vehicle on the first screen of the first display device as the first information, and the vehicle does not display the speed information on the second screen of the second display device.

13. The vehicle according to claim 8, further comprising:

a third display device including a third screen, the third screen being located at a third position farther than the second position of the second screen of the second display device with respect to a seat of the driver in the vehicle, the third position being different from the first position of the first screen of the first display device, wherein the vehicle displays third information on the third screen of the third display when the line-of-sight position of the driver detected by the line-of-sight detection device is on the third screen of the third display device while the vehicle is travelling, and the vehicle controls the third display device to not display the third information when the line-of-sight position of the driver detected by the line-of-sight detection device is not on the third screen of the third display device while the vehicle is travelling.

14. The vehicle according to claim 13, wherein the vehicle displays avoiding danger information for avoiding danger of driving on the first screen of the first display device as the first information, the vehicle displays safety traveling information related to safe traveling of the vehicle on the second screen of the second display device as the second information, and the vehicle displays assisting traveling information for assisting traveling of the vehicle on the third screen of the third display device as the third information.

* * * * *